(12) United States Patent
Huelke

(10) Patent No.: US 10,589,812 B2
(45) Date of Patent: Mar. 17, 2020

(54) METHOD FOR INSTALLING DETAILS ONTO A HEADLINER FOR A VEHICLE

(71) Applicant: Ford Global Technologies, LLC, Dearborn, MI (US)

(72) Inventor: David Huelke, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 58 days.

(21) Appl. No.: 15/986,434

(22) Filed: May 22, 2018

(65) Prior Publication Data

US 2018/0265150 A1    Sep. 20, 2018

Related U.S. Application Data

(62) Division of application No. 14/260,924, filed on Apr. 24, 2014, now Pat. No. 10,005,508.

(51) Int. Cl.
| | |
|---|---|
| *B25H 1/10* | (2006.01) |
| *B62D 65/14* | (2006.01) |
| *B25H 1/04* | (2006.01) |
| *B25H 1/00* | (2006.01) |
| *B23K 37/04* | (2006.01) |
| *B60R 13/02* | (2006.01) |

(52) U.S. Cl.
CPC .............. *B62D 65/14* (2013.01); *B23K 37/04* (2013.01); *B25H 1/0007* (2013.01); *B25H 1/04* (2013.01); *B25H 1/10* (2013.01); *B60R 13/0206* (2013.01); *B60R 13/0225* (2013.01); *B60R 2013/0287* (2013.01); *Y10T 29/49622* (2015.01)

(58) Field of Classification Search
CPC . B62D 65/14; B60R 13/0206; B60R 13/0225; B60R 2013/0287; B25H 1/0007; B25H 1/10; B25H 1/04; B23K 37/04; Y10T 29/49622

See application file for complete search history.

(56) References Cited

U.S. PATENT DOCUMENTS

| | | |
|---|---|---|
| 4,553,309 A | 11/1985 | Hess et al. |
| 4,736,515 A | 4/1988 | Catena |
| 5,105,521 A | 4/1992 | Dowd et al. |
| 5,688,022 A | 11/1997 | Adams et al. |
| 6,470,559 B1 | 10/2002 | Spaulding et al. |
| 6,865,795 B2 | 3/2005 | Hernandez et al. |

(Continued)

FOREIGN PATENT DOCUMENTS

EP          0767037          5/2003

*Primary Examiner* — Sarang Afzali
*Assistant Examiner* — Ruth G Hidalgo-Hernandez
(74) *Attorney, Agent, or Firm* — David Coppiellie; Price Heneveld LLP

(57) ABSTRACT

A headliner assembly apparatus includes an input delivery device attempting to deliver an input related to a predetermined headliner to a controller that is in communication with the input delivery device. An indexing assembly is in communication with the controller, wherein the indexing assembly positions at least one headliner detail in an installation position in response to the input related to the predetermined headliner. A headliner support is adapted to position the predetermined headliner, wherein the predetermined headliner is placed on the indexing assembly, and wherein the headliner is placed to engage the at least one headliner detail in the installation position. A detail installing assembly couples the at least one headliner detail in the installation position to the predetermined headliner.

3 Claims, 5 Drawing Sheets

(56) References Cited

U.S. PATENT DOCUMENTS

2003/0159264 A1    8/2003   McLeod et al.
2010/0060042 A1    3/2010   Budek et al.
2011/0048649 A1    3/2011   Komatsu et al.

METHOD FOR INSTALLING DETAILS ONTO A HEADLINER FOR A VEHICLE

CROSS-REFERENCE TO RELATED APPLICATION

The present application is a divisional of U.S. patent application Ser. No. 14/260,924 filed Apr. 24, 2014, entitled FLEXIBLE HEADLINER ASSEMBLY TABLE, the entire disclosure of which is hereby incorporated herein by reference.

FIELD OF THE INVENTION

The present invention generally relates to vehicle headliners, and more specifically, a flexible headliner assembly table for manufacturing headliners for various vehicles.

BACKGROUND OF THE INVENTION

Most vehicles include a headliner where various headliner details are incorporated within the headliner. These headliner details can include visors, rearview mirrors, consoles, handles, as well as other similar details. Generally, the headliner details are installed within the headliner before the headliner assembly is installed into the vehicle during manufacturing.

SUMMARY OF THE INVENTION

According to one aspect of the present invention, a headliner assembly apparatus includes an input delivery device adapted to deliver an input related to a predetermined headliner to a controller that is in communication with the input delivery device. An indexing assembly is in communication with the controller, wherein the indexing assembly positions at least one headliner detail in an installation position in response to the input related to the predetermined headliner. A headliner support is adapted to position the predetermined headliner, wherein the predetermined headliner is placed on the indexing assembly, and wherein the headliner is placed to engage the at least one headliner detail in the installation position. A detail installing assembly couples the at least one headliner detail in the installation position to the predetermined headliner.

According to another aspect of the present invention, a headliner assembly apparatus includes a controller adapted to receive an input regarding a predetermined headliner. An indexing assembly in communication with the controller is configured to position a detail set in an installation position according to the input. A headliner support is adapted to position the predetermined headliner onto the detail set. A detail installing assembly couples the predetermined headliner to the detail set while the detail set is in the installation position.

According to another aspect of the present invention, a method for installing headliner details onto a headliner for a vehicle includes the steps of providing a headliner for a vehicle and providing a corresponding input associated with the headliner, wherein the input corresponds to a receiving portion of the headliner and a detail set to be coupled to the headliner at the receiving portion. The method also includes providing a headliner assembly apparatus having an input delivery device, a controller in communication with the input device, a headliner support for receiving and positioning the headliner, and an indexing assembly in communication with the controller. An input is delivered to the controller, wherein the input delivery device delivers the corresponding input to the controller. At least one headliner detail is disposed on the indexing assembly, wherein the indexing assembly selectively retains the at least one headliner detail and moves the at least one headliner detail between a plurality of positions, including an installation position to define a detail set. The headliner is delivered to the headliner assembly apparatus, wherein the headliner is delivered to the headliner support and placed on the detail set. The detail set is then coupled to the headliner through a detail installing assembly, wherein the detail set is coupled to the headliner while the detail set remains in the installation position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
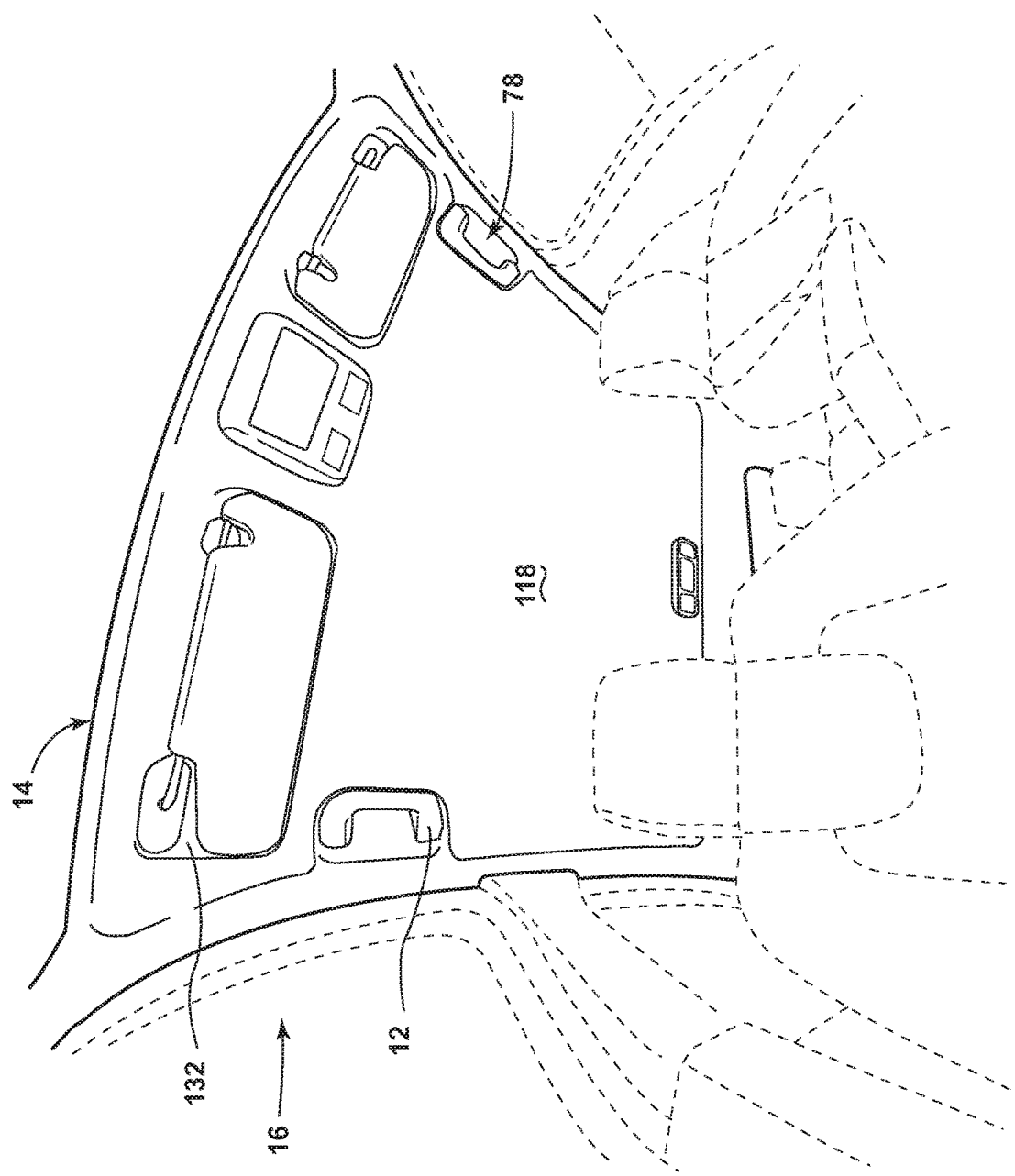
FIG. 1 is an interior perspective view of a vehicle headliner installed within a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
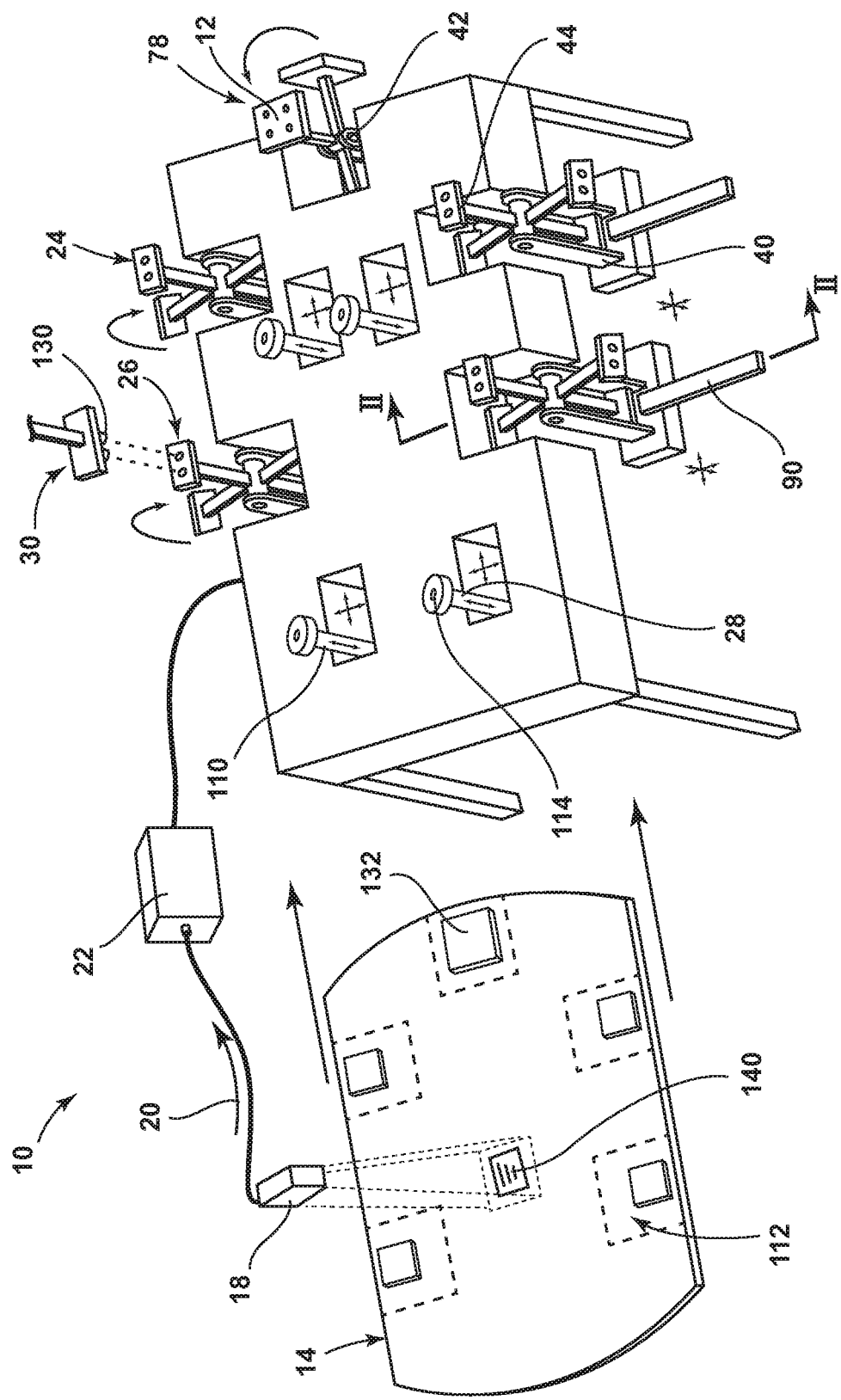
FIG. 2 is a top perspective view of one embodiment of the headliner assembly table showing the headliner being moved toward the headliner assembly table for installation of the headliner details.
Figure 3:
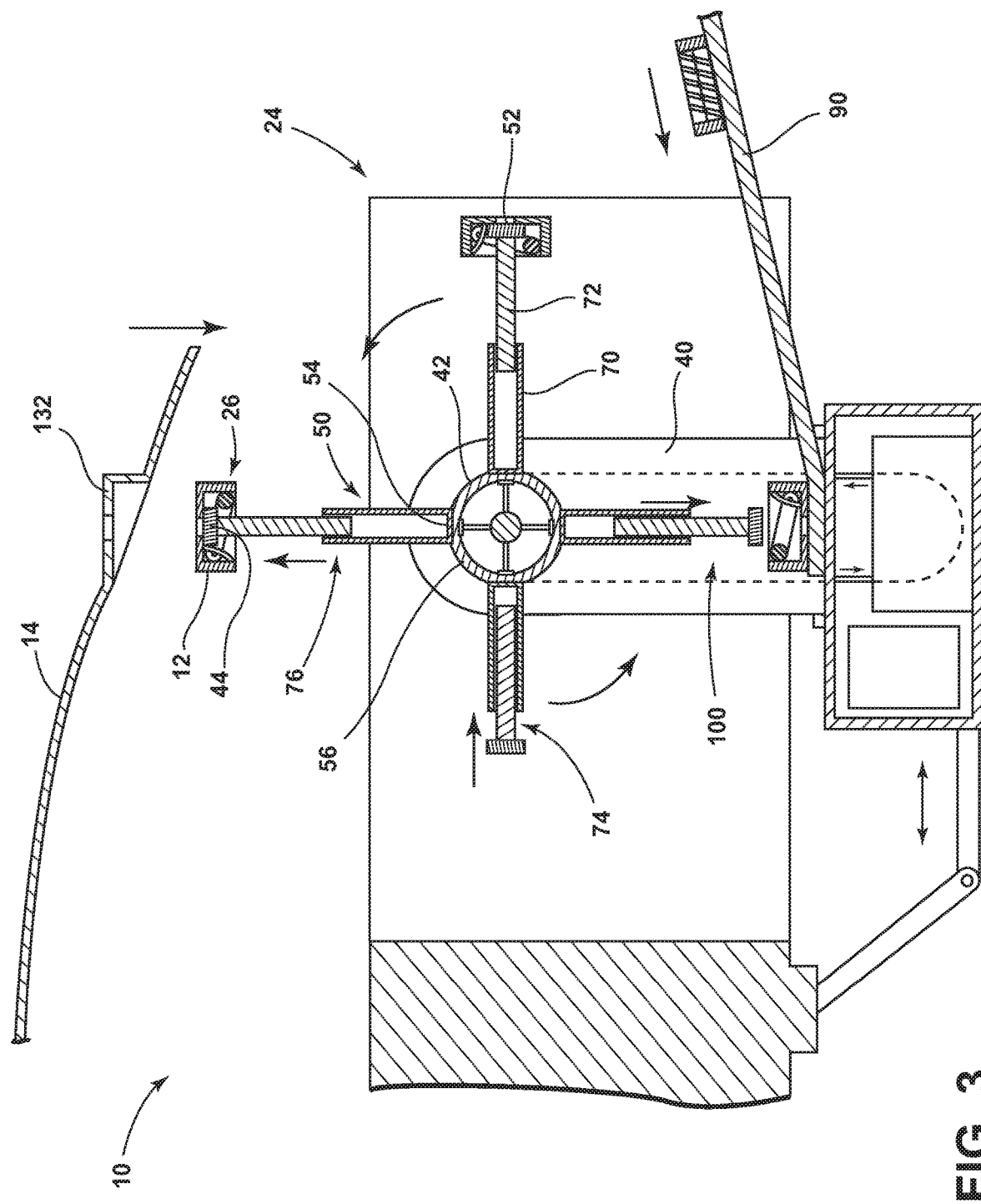
FIG. 3 is a cross-sectional view of the headliner assembly table of FIG. 1 taken along line II-II.

As shown in FIGS. 1-3, reference numeral 10 generally refers to a headliner assembly apparatus for installing headliner details 12 onto a predetermined headliner 14 manufactured for a vehicle 16 (as shown in FIG. 1), according to one embodiment. The headliner assembly apparatus 10 includes an input delivery device 18 adapted to deliver an input 20 related to a predetermined headliner 14 to a controller 22 in communication with the input delivery device 18. An indexing assembly 24 is in communication with the controller 22, wherein the indexing assembly 24 positions at least one headliner detail 12 in an installation position 26 in response to the input 20 related to the predetermined headliner 14. A headliner support 28 is adapted to position the predetermined headliner 14, wherein the predetermined headliner 14 is placed on the indexing assembly 24, and wherein the predetermined headliner 14 is placed to engage the at least one headliner detail 12 in the installation position 26. A detail installing assembly 30 couples the at least one headliner detail 12 in the installation position 26 to the predetermined headliner 14.

Referring again to FIG. 3, each indexing assembly 24 of the headliner assembly apparatus 10 includes a plurality of detailing mechanisms 40, wherein each detailing mechanism 40 positions at least one headliner detail 12 in the installation position 26. In the various embodiments, the headliner details 12 can include one or more of vehicle visors, vehicle grab handles, headliner consoles, vehicle lamps, garment hooks, air handling vents, audio visual equipment, trim members, as well as other similar details that are installed within the headliner 14 of a vehicle 16.

Referring again to FIGS. 2 and 3, each detailing mechanism 40 of the headliner assembly apparatus 10 can include a rotating assembly 42 having a plurality of detailing ends 44, wherein each detailing end 44 selectively receives one of the headliner details 12. Each of the detailing ends 44 rotates within the detail mechanism to successively position each of the headliner details 12 into the installation position 26. The placement of each of the headliner details 12 into the installation position 26 about the rotating assembly 42 is based upon the input 20 received by the controller 22 related to the predetermined headliner 14.

Referring again to FIG. 3, according to the various embodiments, each rotating assembly 42 can include a plurality of extendable arms 50 wherein the detailing end 44 is disposed at the first end 52 of the extendable arm 50 and the second end 54 of the extendable arm 50 is connected to the central rotating portion 56 of the rotating assembly 42. It is contemplated that the indexing assembly 24 of the headliner assembly apparatus 10 can include one or more detailing mechanisms 40. Each of the detailing mechanisms 40 can include one or more extendable arms 50, each including a detailing end 44 for disposing a headliner detail 12 in the installation position 26.

Referring again to FIG. 3, each of the extendable arms 50 of the various rotating assemblies can include a fixed portion 70 and one or more telescoping portions 72 that extend from the fixed portion 70 to operate the detailing end 44 of the extendable arm 50 between retracted and extended positions 74, 76. In various embodiments, it is contemplated that the rotating assembly 42 can include a non-telescoping fixed arm with a detailing end 44, wherein the entire rotating assembly 42 of the detailing mechanism 40 raises and lowers to position the detailing end 44 and the headliner detail 12 attached thereto within the installation position 26 to define a detail set 78. In the various embodiments, in addition to rotating mechanisms, each detailing mechanism 40 can include various alternate assemblies for positioning the headliner details 12 within the installation position 26. Such assemblies can include, but are not limited to, individually operable arms, a surface conveyor, or other similar operable assembly that can be adapted to place a headliner detail 12 within the installation position 26.

Referring again to FIGS. 2 and 3, each detailing mechanism 40 of the indexing assembly 24 can include a detail delivery apparatus 90, wherein the various headliner details 12 to be placed in the installation position 26 are delivered to the detailing mechanism 40. In this manner, the input 20 corresponding to the predetermined headliner 14 is delivered to the controller 22, the appropriate headliner details 12 are placed upon the detail delivery apparatus 90 and positioned within the detail assembly, such that one of the extendable arms 50 can move to the extended position 76 so that one of the detailing ends 44 can selectively retain the headliner detail 12 within a receiving position 100 of the rotating assembly 42, wherein the headliner detail 12 is attached to one of the detailing ends 44 of the rotating assembly 42. In the various embodiments, the detail delivery apparatus 90 can include various mechanisms that can include, but are not limited to, conveyor belts, sliding assemblies, operable arms or other similar delivery mechanisms. It is further contemplated that the headliner details 12 can be placed within the detailing mechanism 40 by hand without the use of tools.

Referring again to FIG. 2, the headliner assembly apparatus 10 can include an indexing assembly 24 containing various detailing mechanisms 40 that are positioned about the headliner assembly apparatus 10. In this manner, each detailing mechanism 40 is positioned in an approximate location relative to the position of various headliner details 12 that will be installed onto the headliner 14 that will be placed upon the headliner assembly apparatus 10. According to the various embodiments, when the controller 22 receives an input 20 regarding a predetermined headliner 14, the various detailing mechanisms 40 of the indexing assembly 24 receives predetermined headliner details 12 to be placed in the installation position 26 based upon the input 20 received by the controller 22. In the various embodiments, the predetermined headliner details 12 related to the predetermined headliner 14 corresponds to those headliner details 12 that will be installed upon a particular headliner 14. In this manner, the headliner assembly apparatus 10 can be used to manufacture headliners 14 for any one of several makes and models of vehicles. Accordingly, individual assembly lines dedicated to manufacturing one type of headliner may not be needed. It is contemplated that each of the detailing mechanisms 40 of the indexing assembly 24 can moved along the x-, y- and z-axes to position the detailing end 44 of each rotating assembly 42 within any number of installation positions 26 corresponding to the predetermined headliner 14.

Figure 4:
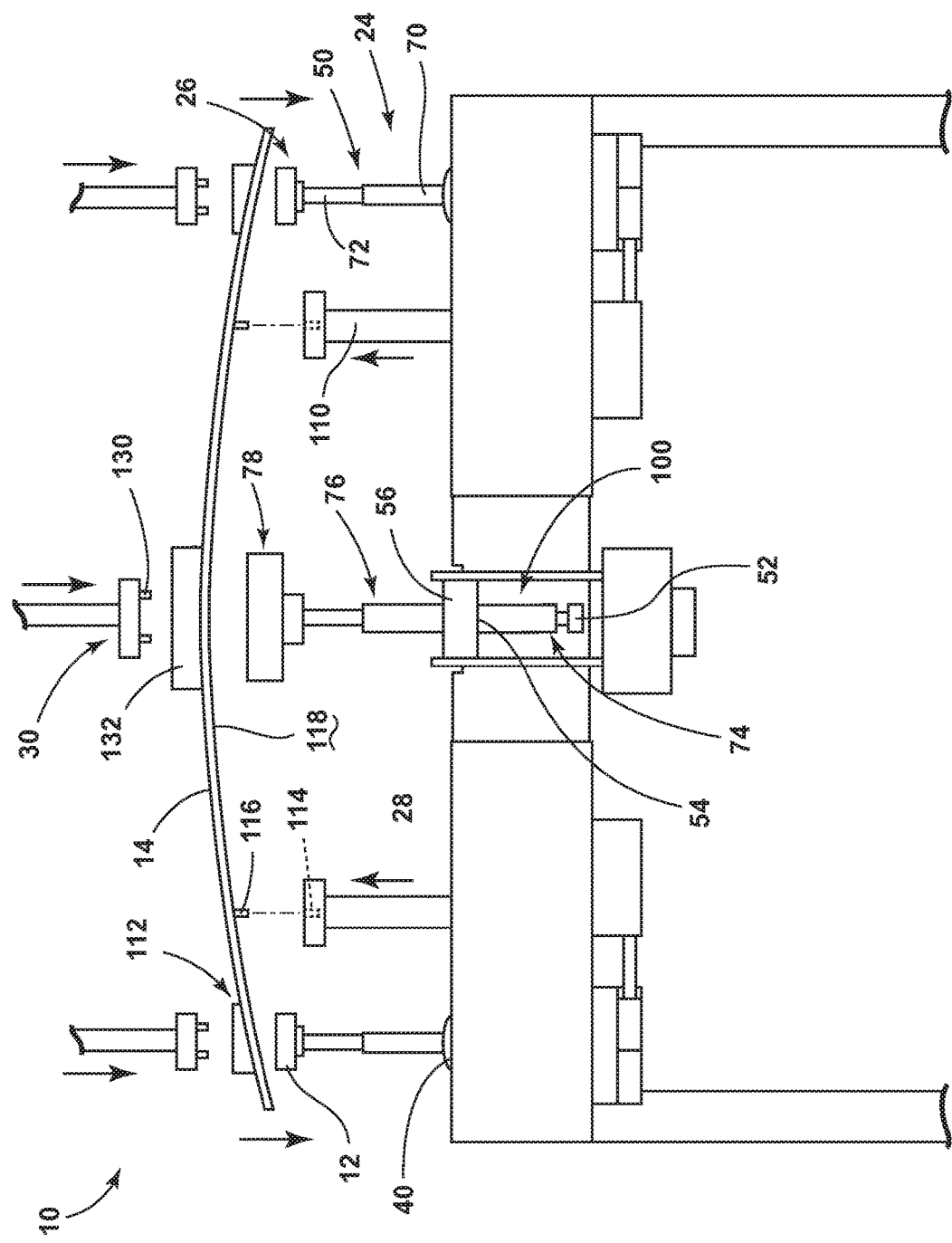
FIG. 4 is a front elevation view of another embodiment of the headliner assembly table showing the headliner being placed upon the detail set positioned by the headliner assembly table in the installation position.

Referring now to FIGS. 2 and 4, it is contemplated that the headliner supports 28 for the headliner assembly apparatus 10 can include a plurality of operable members 110 that cooperatively position the predetermined headliner 14 to engage the respective detail set 78 in the installation position 26. The predetermined headliner 14 can include a receiving portion 112 to which the detail set 78 is coupled. The operable members 110 of the headliner assembly apparatus 10 are configured to manipulate the predetermined headliner 14 to place the receiving portion 112 of the predetermined headliner 14 onto the detail set 78 disposed in the installation position 26. In this manner, the headliner supports 28 of the headliner assembly apparatus 10 are configured to receive the predetermined headliner 14 from any one of various headliner delivery mechanisms. Once received on the headliner supports 28, the headliner supports 28 are adapted to make various adjustments in any one or more of the x, y or z directions to position the receiving portion 112 of the predetermined headliner 14 onto to the detail set 78. In this manner, the detail set 78 remains in its fixed position while the headliner 14 is placed upon the detail set 78 and the detail set 78 is installed thereto.

Referring again to FIGS. 2 and 4, it is contemplated that the headliner supports 28 can include a recess 114 for receiving a corresponding protrusion 116 disposed upon the bottom surface 118 of the predetermined headliner 14, wherein the protrusion 116 of the predetermined headliner 14 engages the recess 114 of the headliner support 28 to specifically position the predetermined headliner 14 upon the headliner supports 28. It is contemplated that, in various embodiments, the headliner supports 28 can include a protrusion 116 and the recess 114 can be defined within the predetermined headliner 14. It is further contemplated that the headliner supports 28 can engage the predetermined headliner 14 through various other temporary attachment mechanisms that include, but are not limited to, magnets, hook and loop, mating surfaces, or other similar temporary attachment mechanisms. It is also contemplated that the headliner supports 28 and predetermined headliner 14 do not include any type of protrusion 116 and recess 114, or other interference-type mechanism to assist in positioning the predetermined headliner 14 upon the headliner support 28. In such an embodiment, the predetermined headliner 14 is placed upon the headliner supports 28 and the headliner support 28 moves the predetermined headliner 14 to the appropriate position such that the receiving portion 112 of the predetermined headliner 14 is placed upon the detail set 78 disposed in the installation position 26.

Referring again to FIGS. 2-4, once the receiving portion 112 of the predetermined headliner 14 is placed upon the detail set 78 in the installation position 26, the detail installing assembly 30 couples the detail set 78 to the headliner 14. In the various embodiments, the detail installing assembly 30 can include a plurality of attaching fixtures 130, wherein each of the plurality of attaching fixtures 130 corresponds to a respective headliner detail 12. Each of the plurality of attaching fixtures 130 is configured to at least partially couple the respective headliner detail 12 to the receiving portion 112 of the predetermined headliner 14. The attaching fixtures 130 can be any one of various mechanisms that can include, but are not limited to, bolts, screws, latching mechanisms, a receptacle for receiving the headliner detail 12, or other similar connecting assembly that is configured to attach the headliner detail 12 to the headliner 14. In the various embodiments, it is contemplated that a separate attaching fixture 130 can be coupled with the receiving portion 112 of a predetermined headliner 14 before the predetermined headliner 14 is placed upon the detail set 78 in the installation position 26. It is further contemplated that each predetermined headliner 14 can include one or more contoured portions 132 that are configured to receive each headliner detail 12 within a particular detail set 78. In this manner, the contoured portion 132 of the predetermined headliner 14 is configured to receive each headliner detail 12 such that the headliner detail 12 is substantially flush with the remainder of the predetermined headliner 14 or such that the headliner detail 12 substantially conforms to the area surrounding the contoured portion 132 of the predetermined headliner 14. It is further contemplated that the contoured portions 132 of the predetermined headliner 14 can be further implemented to specifically position the predetermined headliner 14 upon the detail set 78 to properly locate the predetermined headliner 14 for installation of the detail set 78 within the contoured portions 132 of the predetermined headliner 14.

In the various embodiments, the detail installing assembly 30 can include a plurality of installing mechanisms, each corresponding to one or more of the detailing mechanisms 40 of the indexing assembly 24. In this manner, the detail installing assembly 30 can be adapted to simultaneously install an entire detail set 78 to the predetermined headliner 14 at one time.

Referring again to FIGS. 2-4, the input delivery device 18 of the headliner assembly apparatus 10 is configured to deliver a plurality of inputs 20 to the controller 22. Each of the plurality of inputs 20 delivered to the controller 22 corresponds to a respective predetermined headliner 14 and a corresponding set of headliner details 12 that is to be placed in an installation position 26 and installed within the respective predetermined headliner 14. Each detail set 78 is defined by the detailing mechanism 40 placing at least one headliner detail 12 in the corresponding installation position 26 relating to the respective predetermined headliner 14. In this manner, when the input delivery device 18 receives an input 20 corresponding to a predetermined headliner 14, the controller 22 directs the detail delivery apparatus 90 to deliver specific headliner details 12 to the various detailing mechanisms 40 of the indexing assembly 24. The rotating assemblies of the various detailing mechanisms 40 move the detailing ends 44 to the receiving position 100 to receive each of the headliner details 12 that correspond to the input 20 received by the controller 22. The detailing ends 44 of each of the rotating assemblies 42 are then moved to the installation position 26 where the detail set 78 is defined by each headliner detail 12 being disposed in the installation position 26. The predetermined headliner 14 is then placed upon the headliner assembly apparatus 10 such that the receiving portions 112 of the predetermined headliner 14 are placed in the appropriate location upon the detail set 78 such that each of the headliner details 12 that make up the detail set 78 need not be moved from the installation position 26 during attachment to the predetermined headliner 14. Once the predetermined headliner 14 is properly located, the detail installing assembly 30 couples the appropriate attaching fixture 130 to each respective headliner detail 12 of the detail set 78 and couples the detail set 78 to the predetermined headliner 14. Each of these series of commands can be directed at least partially by the controller 22 as instructed by the input 20 received by the controller 22 from the input delivery device 18. This process is repeated for each of the plurality of inputs 20 received by the controller 22 from the input delivery device 18.

Referring again to FIG. 2, in the various embodiments, the input delivery device 18 can be an indicia scanner, wherein each predetermined headliner 14 includes a corresponding indicia 140 that relates to the predetermined headliner 14 and a corresponding detail set 78. In this manner, each predetermined headliner 14 can includes various indicia 140, including, but not limited to, a bar code, matrix bar code, text-based code, graphic images, or other similar types of indicia 140. The input delivery device 18, according to the various embodiments, is a scanner capable of reading the various indicia 140 placed upon each of the predetermined headliners 14, or otherwise read by the input delivery device 18. The indicia 140 instructs the input delivery device 18 to deliver the input 20 related to the predetermined headliner 14 to the controller 22.

Figure 5:
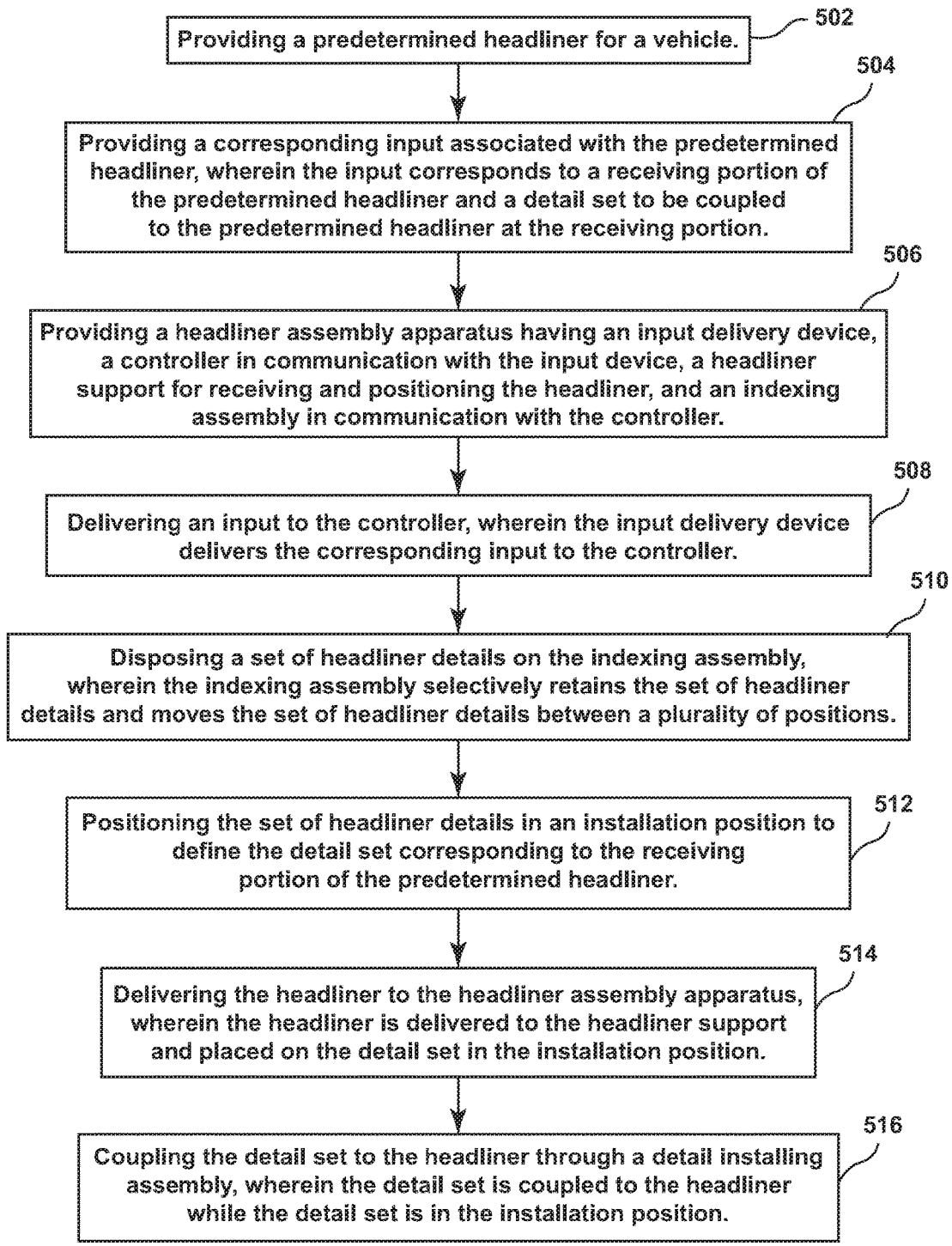
FIG. 5 is a schematic flow diagram of a method for installing headliner details onto a headliner for a vehicle.

Referring now to FIG. 5, having described the various embodiments of the headliner assembly apparatus 10, as described above, a method 500 is disclosed for installing headliner details 12 onto a predetermined headliner 14 for vehicle 16. The method 500 can include providing a predetermined headliner 14 for a vehicle 16 (step 502). According to the various embodiments, the predetermined headliner 14 can include a receiving portion 112 that is configured to receive at least one headliner detail 12. It is contemplated that each receiving portion 112 can include a contoured portion 132 that is adapted to align each headliner detail 12 within the receiving portion 112 of the predetermined headliner 14. According to the various embodiments, the predetermined headliner 14 can be a headliner 14 for any one of numerous vehicles. Accordingly, a single headliner assembly apparatus 10 can be configured to manufacture several different headliners 14 for a variety of vehicles.

Referring again to FIG. 5, according to another step of the method 500, a corresponding input 20 associated with the predetermined headliner 14 is provided, wherein the input 20 corresponds to a receiving portion 112 of the predetermined headliner 14 in a corresponding detail set 78 to be coupled to the headliner 14 at the receiving portion 112 (step 504). As discussed above, each of the predetermined headliners 14 includes one or more indicia 140 that are configured to be scanned or otherwise read by an input delivery device 18 of the headliner assembly apparatus 10. The indicia 140 scanned by the input delivery device 18 instructs the input delivery device 18 to deliver an input 20 corresponding to the predetermined headliner 14 to the controller 22. The input 20 delivered to the controller 22 corresponds to a predetermined headliner 14, a predetermined detail set 78, a predetermined set of attaching fixtures 130, a predetermined installation position 26, a predetermined position for the headliner supports 28, a predetermined position and movement pattern for the detail installing assembly 30, and other various instructions and alignments for various portions of the headliner assembly apparatus 10 as well as various operations engaged by the headliner assembly apparatus 10 during manufacture of the predetermined headliner 14.

As shown in FIG. 5, the method 500 also includes providing a headliner assembly apparatus 10 having an input delivery device 18, a controller 22 in communication with the input delivery device 18, a headliner support 28 for receiving and positioning the headliner 14, and an indexing assembly 24, for communicating with the controller 22 (step 506). As discussed above, various portions of the headliner assembly apparatus 10, including the headliner support 28 and indexing assembly 24, are operable within the headliner assembly apparatus 10 for positioning the various headliner details 12 within the installation position 26 to define the detail set 78 and also for positioning the headliner 14 upon the detail set 78 for installation of the various headliner details 12.

As illustrated in FIG. 5, another step of the method 500 includes delivering an input 20 to the controller 22, wherein the input delivery device 18 delivers the corresponding inputs 20 to the controller 22 (step 508). According to the method 500, once the indicia 140 of the predetermined headliner 14 are scanned by the input delivery device 18, the input delivery device 18 delivers the appropriate corresponding inputs 20 to the controller 22 relating to the predetermined headliner 14. In this manner, the input delivery device 18 can scan a plurality of indicia 140 corresponding to a respective plurality of predetermined headliners 14 such that the headliner assembly apparatus 10 prepares to dispose each of the predetermined set of headliner details 12 into the installation position 26 corresponding to the appropriate predetermined headliner 14. It is contemplated that each of the detailing mechanisms 40 of the indexing assembly 24 can include a plurality of detailed staging areas wherein several headliner details 12 are placed proximate to the detailing mechanism 40 such that when the predetermined headliner 14 corresponding to one of the headliner details 12 disposed in the staging area is proximate the headliner assembly apparatus 10, the appropriate headliner detail 12 can be placed within the detailing mechanisms 40 such that the detailing end 44 of the rotating assembly 42 can be moved into the receiving position 100 to receive the appropriate headliner detail 12 for the corresponding predetermined headliner 14. The various staging areas of the detailing mechanisms 40 of the headliner assembly apparatus 10 are configured to allow the headliner assembly apparatus 10 to continuously manufacture a series of predetermined headliners 14 without interruption due to waiting for either the predetermined headliner 14 or one of the headliner details 12 to be placed in the appropriate position for installation on the predetermined headliner 14.

Referring again to FIG. 5, another step of the method 500 includes disposing a predetermined set of headliner details 12 on the indexing assembly 24, wherein the indexing assembly 24 selectively retains the set of headliner details 12 and moves the headliner details 12 between a plurality of positions (step 510). The various positions can include a receiving position 100 wherein a detailing end 44 of the rotating assembly 42 receives the various headliner details 12, and rotates the headliner details 12 to the installation position 26 to define the detail set 78. The various rotating assemblies 42 can move each headliner detail 12 to a variety of positions between the receiving position 100 and the installation position 26, such as various intermediary positions wherein the corresponding predetermined headliner 14 is approaching the headliner assembly apparatus 10 to be placed upon the headliner supports 28.

In the various embodiments, the rotating assembly 42 can include a plurality of extendable arms 50 wherein the extendable arms 50 rotate about a central axis to define the various positions of the detailing end 44 of the rotating assembly 42. When one of the extendable arms 50 of the rotating assembly 42 is disposed within the receiving position 100, the detailing end 44 is positioned to receive a headliner detail 12. Another end of the extendable arm 50 of the rotating assembly 42 can be disposed within the installation position 26, wherein the detail set 78 is being installed upon the corresponding predetermined headliner 14. Additional extendable arms 50 can be disposed within various intermediary positions either preparing to place a headliner detail 12 within the installation position 26, or preparing to move into the receiving position 100 to receive a headliner detail 12.

Once the set of headliner details 12 are disposed within the indexing assembly 24, another step in the method 500 includes positioning the set of headliner details 12 in the installation position 26 to define the detail set 78 that corresponds to the receiving portion 112 of the predetermined headliner 14 (step 512). In this manner, the various headliner details 12 are disposed within the installation position 26 before the arrival of the corresponding predetermined headliner 14. Accordingly, once the predetermined headliner 14 is placed upon the detail set 78, each of the headliner details 12 is simultaneously ready for installation upon the predetermined headliner 14.

Once the headliner details 12 are placed within the installation position 26 to define the detail set 78, the method 500 also includes the step of delivering the predetermined headliner 14 to the headliner assembly apparatus 10, wherein the predetermined headliner 14 is delivered to the headliner support 28 and placed on the detail set 78 (step 514). As discussed above, the headliner support 28 of the headliner assembly apparatus 10 is configured to move the predetermined headliner 14 either in fine or large incremental movements to appropriately position the receiving portion 112 of the predetermined headliner 14 onto the detail set 78.

Referring again to FIG. 5, once the headliner 14 is positioned such that the receiving portion 112 of the predetermined headliner 14 is placed upon the detail set 78, the method 500 further includes coupling the detail set 78 to the headliner 14 through a detail installing assembly 30. In this manner, the detail set 78 is coupled to the predetermined headliner 14 while a detail set 78 remains in the installation position 26 (step 516). In the various embodiments, the headliner assembly apparatus 10 can include a platform-type assembly wherein various portions of the indexing assembly 24 and headliner support 28 are coupled to the platform assembly. In various alternate embodiments, the various portions of the headliner assembly apparatus 10 can be attached to the floor or other portion of the structure within which the headliner 14 is manufactured, and without the presence of a platform or other intermediary supporting structure. Where a platform, table, or other similar structure is used for the headliner assembly apparatus 10, various mechanical portions of the headliner assembly apparatus 10 can be contained within the platform or table.

According to the various embodiments, the various positions of the indexing assembly 24, headliner support 28, and other operable portions of the headliner assembly apparatus 10 need to be preprogrammed such that when a particular indicia 140 of a predetermined headliner 14 is scanned, the information relating to the positions of the various aspects of the headliner assembly apparatus 10 are contained within a database for the headliner assembly apparatus 10 such that the scanning of the indicia 140 simply recalls the pre-stored information to configure the location of the various aspects of the headliner assembly apparatus 10. In various alternate embodiments, the indicia 140 relating to the predetermined headliner 14 can be configured to include all of the programming and information necessary to properly align the various aspects of the headliner assembly apparatus 10, such that preprogramming of the various positions of the aspects of the headliner assembly apparatus 10 may not be necessary.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for installing details onto a headliner for a vehicle, the method including steps of:
    providing a corresponding headliner for a vehicle;
    providing a corresponding input associated with the corresponding headliner, wherein the corresponding input relates to a receiving portion of the corresponding headliner and a detail set to be coupled to the receiving portion;
    providing a headliner assembly apparatus having an input delivery device, a controller in communication with the input delivery device, a headliner support for receiving and positioning the corresponding headliner, and an indexing assembly in communication with the controller;
    delivering the corresponding input to the controller, wherein the input delivery device delivers the corresponding input to the controller;
    disposing a set of headliner details on the indexing assembly, wherein the indexing assembly selectively retains the set of headliner details and moves the set of headliner details between a plurality of positions;
    positioning the set of headliner details in an installation position to define the detail set corresponding to the receiving portion of the corresponding headliner;
    delivering the corresponding headliner to the headliner assembly apparatus, wherein the corresponding headliner is delivered to the headliner support and is placed on the detail set in the installation position; and
    coupling the detail set to the corresponding headliner through a detail installing assembly, wherein the detail set is coupled to the corresponding headliner while the detail set is in the installation position; wherein
        the set of headliner details includes at least one headliner detail;
        the indexing assembly includes a plurality of detailing mechanisms, wherein each detailing mechanism positions the at least one headliner detail in the installation position;
        each detailing mechanism is a rotating assembly with a plurality of detailing ends;
        each detailing end selectively receives one headliner detail of the set of headliner details; and
        the plurality of detailing ends are rotated about the rotating assembly to successively position the set of headliner details into the installation position based upon the corresponding input related to the corresponding headliner.

2. The method of claim 1, wherein the at least one headliner detail includes any one or more of vehicle visors, vehicle grab handles, headliner consoles, vehicle lamps, garment hooks, and air handling vents.

3. A method for installing details onto a headliner for a vehicle, the method including steps of:
    providing an input associated with a corresponding headliner to a controller;
    positioning a set of headliner details in an installation position to define a detail set corresponding to a receiving portion of the corresponding headliner, the detail set and the receiving portion corresponding to the input;
    delivering the corresponding headliner to the detail set in the installation position; and
    coupling the detail set to the corresponding headliner while the detail set is in the installation position; wherein
        the detail set includes at least one headliner detail wherein the at least one headliner detail includes any one or more of vehicle visors, vehicle grab handles, headliner consoles, vehicle lamps, garment hooks, and air handling vents;
        the detail set is positioned by an indexing assembly that includes a plurality of detailing mechanisms, wherein each detailing mechanism positions at least one headliner detail in the installation position; and
        each detailing mechanism is a rotating assembly with a plurality of detailing ends, wherein each detailing end of the plurality of detailing ends selectively receives one headliner detail of the at least one headliner detail, and wherein the detailing ends are rotated about the rotating assembly to successively position the one headliner detail into the installation position based upon the input related to the corresponding headliner.

* * * * *